United States Patent Office 3,438,980
Patented Apr. 15, 1969

3,438,980
N¹-ACETYL-N¹-(CYCLOPROPYL-2-PYRIMIDINYL)-SULPHANILAMIDES
Markus Zimmermann, Riehen, Switzerland, assignor to Geigy Chemical Corporation, Ardsley, N.Y., a corporation of New York
No Drawing. Filed Mar. 14, 1967, Ser. No. 622,902
Int. Cl. C07d 51/44
U.S. Cl. 260—239.75        3 Claims

ABSTRACT OF THE DISCLOSURE

N¹-acetyl-N¹-(2-pyrimidinyl) - sulphanilamides substituted by a cyclopropyl group in 4-, 5- or 6-position, which are antibacterial agents against gram positive bacteria such as staphylococci, streptococci, pneumococci and against gram-negative bacteria such as salmonella, escherichia and klebsiella strains; pharmaceutical compositions containing the aforesaid pyrimidines as antibacterial ingredients, and a method of treating diseases caused by such bacteria, by administration of such pyrimidines or pharmaceutical compositions containing them.

FIELD OF THE INVENTION

The present invention concerns new sulphanilamide derivatives, processes for the production thereof, medicaments which contain the new compounds and the use thereof.

SUMMARY OF THE INVENTION

The invention provides in a first aspect novel sulfanilamidopyrimidines of the formula

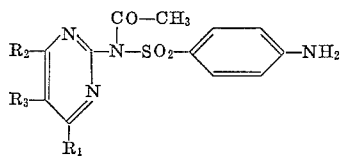

wherein
a single one of $R_1$, $R_2$ and $R_3$ represents the cyclopropyl group, and when not representing the cyclopropyl group,
$R_1$ and $R_2$ independently of each other represent hydrogen, halogen atoms, lower alkyl, lower alkoxy or lower alkylthio groups, and
$R_3$ represents hydrogen, a lower alkyl or lower alkoxy group;

these novel compounds have an excellent antibacterial action which, being practically harmless to mammals when used in antibacterially effective dosages, are therefore useful as antibacterial agents in the treatment of infectious diseases.

In a second aspect, the invention provides pharmaceutical compositions containing an antibacterially effective amount of a compound according to the invention and a pharmaceutically acceptable carrier therefor.

A third aspect of the invention provides for a method of treating infectious diseases in mammals by administering to an individual suffering therefrom an antibacterially effective amount of a compound according to the invention.

DETAILED DESCRIPTION OF THE INVENTION AND PREFERRED EMBODIMENT

In the compounds of general Formula I, $R_1$, $R_2$ and $R_3$ as alkyl groups are, e.g. the methyl, ethyl, propyl or the isopropyl group and, as alkoxy groups they are, e.g. the methoxy, ethoxy, propoxy or the isopropoxy group.

In addition, as alkylthio groups, $R_1$ and $R_2$ are, e.g. the methylthio or the ethylthio group.

As halogen atoms $R_1$ and/or $R_2$ represent especially chlorine or bromine, but most preferably chlorine. A preferred compound is N¹-acetyl-N¹-(5-cyclopropyl-2-pyrimidinyl)-sulphanilamide.

To produce these new compounds, a compound of general Formula II

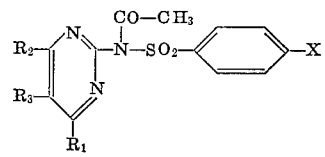

wherein X represents a group which can be converted by reduction into the amino group, and $R_1$, $R_2$ and $R_3$ have the meanings given in Formula I, is reduced or, if desired, a compound of the general Formula II wherein X is a substituted methylene amino group is partially hydrolysed, i.e. the N¹-acetyl group is maintained. Groups which can be converted by reduction into the amino group are, e.g. the benzyloxycarbonylamino group (carbobenzyloxyamino group) and the nitro group, also, e.g. substituted methylene amino groups such as the benzylidene amino group as well as substituted azo groups such as the phenylazo or p-dimethylaminophenylazo group. In the azo compounds mentioned, the amino group is formed from the nitrilo radical

bound to the benzene ring by one of its three valences. A corresponding nitrilo radical is also present in the N,N'-diacetyl-azobenzene-4,4'-disulphonamides both sulphonamide groups of which carry identical 2-pyrimidinyl radicals substituted corresponding to the definition of $R_1$, $R_2$ and $R_3$, and on the reduction of which two molecules of a compound of general Formula I are formed. The reduction to the amino group of groups X which can be reduced or split by reduction can be performed catalytically, e.g. by means of hydrogen in the presence of a palladium catalyst or of Raney nickel, in an inert organic solvent such as dioxane or ethanol, but also other processes such as the reduction of nitro groups and also azo groups by means of iron in acetic or hydrochloric acid can be used. The benzylidene amino group in particular is suitable as substituted methylene amino group X which can be split by hydrolysis. Compounds of general Formula II which contain this group can be partially hydrolysed under careful conditions, e.g. by heating with water to 40° or higher, to form compounds of general Formula I.

Starting materials of the general Formula II can be obtained, e.g. by reacting a derivative of a p-substituted benzene sulphonic acid corresponding to the general Formula III

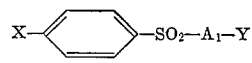

with a compound of the general Formula IV

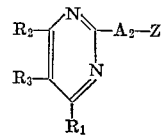

wherein
one of the two symbols $A_1$ and $A_2$ represents the imino group (—NH—) and the other the direct bond, and Y and Z represent reactive radicals which can be split off together, and R$_1$, R$_2$ and R$_3$ have the meanings given in Formula I and X has that given in Formula II, the reaction optionally being performed in the presence of an acid binding agent, to form a compound of general Formula V

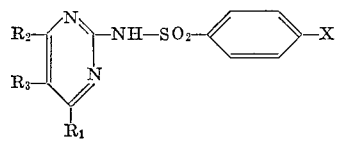

( )

wherein R$_1$, R$_2$ and R$_3$ have the meanings given in Formula I and X has that given in Formula II, and reacting the latter compound with acetanhydride, in the presence of pyridine, at room temperature or moderately elevated temperature. For example, acetanhydride is used in multiple excess and, together with pyridine, serves at the same time as reaction medium. Should the compound obtained of general Formula V contain halogen atoms, particularly chlorine atoms as radicals R$_1$ and/or R$_2$, they can if desired, be reacted before the acetylation with a metal compound of a low alkanol or alkane thiol in order to replace the halogen atom(s) by one or two low alkoxy or alkylthio groups. The various possibilities for the symbols A$_1$, A$_2$, Y and Z, the performance of the reaction of the corresponding compounds of the general Formulae III and IV and also the production of the latter group of compounds, which are new substances, is further illustrated below.

If, in the compound of general Formula III, A$_1$ is the imino group and, in that of general Formula IV, A$_2$ is the direct bond, Y is, e.g. a monovalent cation, particularly an alkali metal ion or the normal equivalent of a polyvalent cation, and Z is a halogen atom, particularly a chlorine or bromine atom, also a cyanamino or nitroamino radical or, provided R$_1$ and/or R$_2$ is/are not (an) alkylthio group(s), it is a low alkylsulphonyl radical.

On the other hand, if A$_1$ is the direct bond and A$_2$ is the imino group, then Y is, e.g. a halogen atom, particularly a chlorine atom, or an acyloxy radical, e.g. a radical of the general Formula VI

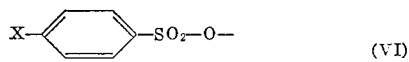

(VI)

wherein X has the meaning given in Formula II and Z represents a hydrogen atom.

The reactions of compounds of general Formula III with those of general Formula IV are performed, e.g. in a suitable organic solvent such as dimethyl formamide, acetamide, N,N-dimethyl acetamide or dimethyl sulphoxide, while heating. If an acid is formed as liberated compound Y–Z, the reaction is performed in the presence of an acid binding agent such as pyridine or trimethylamine in methylene chloride.

Reactions of compounds of the general Formula V, wherein R$_1$ and/or R$_2$ represent(s) halogen with metal compounds, in particular alkali metal compounds such as sodium compounds, of low alkanols, are most simply performed in the alkanols concerned as solvent while heating, e.g. at boiling temperature or at a raised temperature, in a closed vessel. In addition, dimethyl sulphoxide or dimethyl formamide can also be used as solvent. The same solvents and temperatures are also suitable for the reaction of compounds of general Formula V, wherein R$_1$ and/or R$_2$ represent(s) halogen, with alkyl mercaptides, in particular with alkali metal alkyl mercaptides.

To produce a first group of compounds of the general Formula IV wherein A$_2$ is the direct bond, Z is a low alkylsulphonyl group or a halogen atom, R$_1$ and R$_2$ are halogen atoms, alkoxy or alkyl thio groups, and R$_3$ is the cyclopropyl group, cyclopropyl malonic acid dialkyl esters, particularly the diethyl ester (cf. L. J. Smith et al., J. Org. Chem. 15, 73/1950) are used as starting materials. This ester is condensed with thiourea to form 2-mercapto-5-cyclopropyl-4,6-pyrimidine diol which is methylated, e.g. with dimethyl sulphate in the presence of an acid binding agent, to 2-methylthio-5-cyclopropyl-4,6-pyrimidine diol. The latter compound can also be obtained in one step by condensation of the malonic acid ester mentioned with S-methyl isothiourea. Finally, the hydroxyl groups in the pyrimidine diol obtained are replaced by chlorine by treating with an inorganic acid halide such as phosphorus oxychloride in the presence of a tertiary organic base such as N,N-diethyl aniline and, if desired, the 2-methylthio-5-cyclopropyl - 4,6 - dichloro-pyrimidine obtained is reacted with the metal compound of a low alkanol to form a 2-methylthio-5-cyclopropyl-4,6-dialkoxy pyrimidine. The corresponding 2-methylsulphonyl-5-cyclopropyl pyrimidines, i.e. 2-methylsulphonyl-5-cyclopropyl-4,6-dichloro- and 2-methylsulphonyl-5-cyclopropyl-4,6-dialkoxy-pyrimidines are obtained from the 2-methylthio compounds mentioned with an oxidising agent, e.g. with peracetic acid. For example, corresponding compounds having a different low alkylsulphonyl radical in the 2-position and/or bromine atoms in the 4- and 6-position can also be obtained analogously.

On the other hand, the 2-methylthio-5-cyclopropyl-4,6-pyrimidine diol mentioned previously can also be converted, e.g. by boiling with 10% aqueous chloroacetic acid or with concentrated hydrochloric acid, into 5-cyclopropyl-2,4,6-pyrimidine triol (5-cyclopropyl barbituric acid) and the latter can be modified into 2,4,6-trichloro-5-cyclopropyl pyrimidine by treatment with an inorganic acid halide in the presence of a tertiary organic base, e.g. with phosphorous oxychloride and N,N-diethyl aniline. This compound, which is already embraced by general Formula IV, can be used direct for the reaction with a compound of general Formula III, provided the simultaneous formation of isomeric N$^1$-(2,6-dichloro-5-cyclopropyl-4-pyrimidinyl)-sulphanilamide is taken into account. In addition, further compounds of general Formula IV are obtained, e.g. by converting the trichloropyrimidine mentioned with a low alkyl mercaptan in the presence of a low sodium alcoholate, into a 2,4-dichloro-5-cyclopropyl-6-alkylthio-pyrimidine. In the reaction of these pyrimidines with compounds of general Formula III, N-(4-chloro-5-cyclopropyl-6-alkylthio-2-pyrimidinyl)-benzene sulphonamides substituted by a group X in the p-position are formed.

To produce a second group of compounds of the general Formula IV wherein A$_2$ is the direct bond, Z is a halogen atom or a low alkylsulphonyl group, R$_1$ is a halogen atom or a low alkoxy or alkylthio group, R$_2$ is the cyclopropyl group and R$_3$ is hydrogen, a low alkyl or alkoxy group, for example the known esters of β-oxo-cyclopropane propionic acid, particularly the ethyl or methyl ester, or the low alkyl esters of α-alkyl-β-oxo- or α-alkoxy-β-oxo-cyclopropane propionic acids are used as starting materials. The α-alkyl-β-oxo-cyclopropane propionic acid alkyl esters, can be obtained, e.g. from β-oxo-cyclopropane propionic acid alkyl esters and alkyl iodides in the presence of a low sodium alcoholate and the corresponding α-alkoxy-β-oxo-cyclopropane propionic acid alkyl esters can be obtained from α-diazo-β-oxo-cyclopropane propionic acid alkyl esters and a low alkanol in the presence of copper and borotrifluoride etherate. The esters mentioned are condensed with thiourea to form 2-mercapto-6-cyclopropyl-, 2-mercapto-5-alkyl-6-cyclopropyl- or 2-mercapto-5-alkoxy-6-cyclopropyl-4-pyrimidinols. If S-alkylthiourea is used as condensation component instead of thiourea, then instead of the 2-mercapto-4-pyrimidonals, the corresponding 2-alkylthio compounds are obtained. These intermediate products can be modified into 2-alkylsulphonyl pyrimidines analogously to the method described in the production of the first group of compounds of general Formula IV, or the 2-alkylthiopyrimidines can be converted by way of the 2-pyrimidinols into 2-halogen pyrimidines; also the hydroxyl group in the 4-position can be replaced analogously by halogen or an alkoxy group. The following compounds, for example, of general Formula IV are obtained: 2-methylsulphonyl-4-chloro-6-cyclopropyl pyrimidine, 2-methylsulphonyl-4-methoxy-5-cyclopropyl pyrimidine, 2-methyl-sulphonyl-4-bromo-6-cyclopropyl pyrimidine, 2,4-dichloro-6-cyclopropyl pyrimidine and 2,4-dibromo-6-cyclopropyl pyrimidine and their low 5-alkyl or 5-alkoxy derivatives as well as other corresponding 2-alkylsulphonyl pyrimidines.

To produce a third group of compounds of the general Formula IV wherein $A_2$ is the direct bond, Z is a low alkylsulphonyl group or a halogen atom, $R_1$, $R_2$ and $R_3$ can be hydrogen or low alkyl groups, and one of $R_2$ and $R_3$ is the cyclopropyl group, for example a dioxo compound of the general Formula VIII

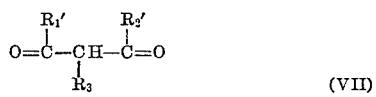

(VII)

wherein $R_1'$ represents hydrogen or a low alkyl group,
$R_2'$ represents hydrogen, a low alkyl group or the cyclopropyl group, and
$R_3$ has the meaning given in Formula I, one of $R_2'$ and $R_3$ being the cyclopropyl group, or an acetal, enol ether, enamine or ketal of such a compound is condensed in the presence of an alkaline or acid condensing agent with thiourea or S-alkyl-isothioureas. The optionally alkylated 2-alkylthio-5-cyclopropyl pyrimidines or 2-alkylthio-6-cyclopropyl pyrimidines obtained with S-alkyl-isothioureas can be oxidised direct, e.g. by means of peracetic acid, to form the corresponding 2-alkylsulphonyl pyrimidines of the general Formula IV. The corresponding thiourea condensation products, i.e. the optionally alkylated 2-mercapto-5-cyclopropyl pyrimidines or 2-mercapto-6-cyclopropyl pyrimidines, are converted, e.g. by boiling with 10% aqueous chloroacetic acid or with concentrated hydrochloric acid, into the corresponding 2-pyrimidinols. These intermediate products are then reacted with inorganic acid halides in the presence of tertiary organic bases, e.g. with phosphorous oxychloride and N,N-diethyl aniline, to form the corresponding, optionally alkylated 2-halogen pyrimidines embraced by general Formula IV, in particular to form the 2-chloro-5-cyclopropyl pyrimidines or 2-chloro-6-cyclopropyl pyrimidines. Examples of such compounds are 2-chloro-5-cyclopropyl pyrimidine and 2-chloro-6-cyclopropyl pyrimidine as well as their 4- and/or 6-, or 4- and/or 5-alkyl or dialkyl derivatives. However, the 2-mercapto pyrimidines mentioned previously can also be alkylated, i.e. reacted with low dialkyl sulphates or alkyl halides in the presence of an acid binding agent, whereupon the 2-alkylthio compounds are oxidised as described above to form the 2-alkylsulphonyl compounds. Examples of such compounds of general Formula IV are 2-methylsulphonyl-5-cyclopropyl pyrimidine and 2-methylsulphonyl-6-cyclopropyl pyrimidine as well as their 4- and/or 6-, or 4- and/or 5-alkyl or dialkyl derivatives.

A fourth group of compounds of general Formula IV wherein $A_2$ is the imino group and Z is hydrogen and $R_1$, $R_2$ and $R_3$ have the meanings given in Formula I are obtained, e.g. from the 2-alkylsulphonyl compounds of the first three groups, by reacting these with ammonia. They can also be obtained in another way however, by reacting guanidine with alkyl esters of cyclopropyl malonic acid, β-oxo-cyclopropane propionic acid, α-alkyl-β-oxo-cyclopropane propionic acids or α-alkoxy-β-oxo-cyclopropane propionic acids and converting the reaction products, e.g. 2-amino-5-cyclopropyl-4,6-pyrimidine diol, 2-amino-6-cyclopropyl-4-pyrimidinol, 2-amino-5-alkyl-6-cyclopropyl-4-pyrimidinols or 2-amino-5-alkoxy-6-cyclopropyl-4-pyrimidinols, with phosphorus oxychloride into e.g. 2-amino-5-cyclopropyl - 4,6 - dichloropyrimidine, 2-amino - 4 - chloro-6-cyclopropyl pyrimidine, 2-amino-4-chloro-5-alkyl-6-cyclopropyl pyrimidines or 2-amino-4-chloro-5-alkoxy-6-cyclopropyl pyrimidines, respectively. Again, the corresponding low alkoxy or alkylthio pyrimidines can be produced from these substituted chloropyrimidines with sodium and a low alkanol or alkane thiol.

In addition, the substituted 2-aminopyrimidines obtained can be converted with nitric acid into corresponding 2-nitro-amino pyrimidines which form a fifth group of compounds of the general Formula IV.

A representative of a sixth group of compounds of general Formula IV, a substituted 2-cyanamino pyrimidine, is obtained, e.g. by reacting dicyanodiamide with 1-cyclopropyl-1,3-butane dione to form 2-cyanamino-4-methyl-6-cyclopropyl pyrimidine. Other compounds of this type can be produced analogously.

The new sulphanilamide derivatives corresponding to the general Formula I are suitable for the preparation of medicaments for internal or external use, e.g. for the treatment of infections caused by gram positive bacteria such as staphylococci, streptococci, pneumococci as well as gram negative bacteria such as *Salmonella typhi*, *Escherichia coli* and *Klebsiella pneumoniae*.

The new active substances are administered per os. The daily dosages vary between 200 and 5,000 mg. for adult patients. Suitable dosage units such as tablets preferably contain 150–700 mg. of an active substance according to the invention. Also corresponding amounts of forms for use not made up into single dosages such as syrups, ointments or powders can also be used.

Dosage units for oral administration preferably contain between 60% and 90% of a compound of general Formula I as active substance. They are produced by combining the active substance with e.g. solid, pulverulent carriers such as lactose, saccharose, sorbitol, mannitol; starches such as potato starch, maize starch or amylopctin, also laminaria powder or citrus pulp powder; cellulose derivatives or gelatines, optionally with the addition of lubricants such as magnesium or calcium stearate or polyethylene glycols of suitable molecular weights, to form tablets.

The following prescription further illustrates the production of tablets:

50.000 kg. of $N^1$-acetyl-$N^1$-(6-cyclopropyl-2-pyrimidinyl)-sulphanilamide are mixed with 2.000 kg. of stearic acid in 4 litres of ethanol and the whole is mixed for 15 minutes. 1.200 kg. of gelatine in 16 litres of distilled water are then added and the mass is kneaded for 20 minutes. As soon as it is sufficiently moist, it is granulated through a sieve (25 meshes/sq. cm.) and dried. The dried granules are again sieved (60 meshes/sq./cm.) and then mixed for 1 hour with 4.000 kg. of potato starch, 1.200 kg. of talcum and 0.400 kg. of sodium carboxymethyl cellulose. The mass obtained is pressed into 100,000 tablets each weighing 600 mg. and containing 500 mg. of active substance.

The following example further illustrates the production of the new compounds of general Formula I and of hitherto undescribed intermediate products but in no way limits the scope of the invention. The temperatures are given in degrees centigrade.

Example (a) 182 ml. of dry ethanol are added to 16.8 g. of cyclopropyl methyl ketone. The mixture obtained is stirred and, at a temperature of 65–70°, a solution of 32.8 g. of bis-(dimethylamino)-methoxymethane (cf. H. Bredereck et al., Chem. Ber. 98, 1078 [1965]) in 122 ml. of dry ethanol is added dropwise within 3 hours, whereupon the whole is refluxed for 15 hours. The ethanol is then distilled off and the residue is fractionated. The pure 1-cyclopropyl-3-dimethylamino-propen-1-one boils at 100–103°/ 0.007 torr and, after solidifying, melts at 44–46°.

(b) 7.1 g. of the ketone obtained according to (a) and 11 g. of guanidine carbonate are stirred in 10 ml. of ethylene glycol monoethyl ether and reacted for 16 hours at a bath temperature of 140–150°. The reaction mixture is cooled to 20°, diluted with water and extracted three times with methylene chloride. The three extracts are washed, one after the other, twice with water, then combined and dried over sodium sulphate. After distilling off the methylene chloride, crude, crystalline 2-amino-6-cyclopropyl pyrimidine remains which melts at 135–137°.

(c) 3.0 g. of 2-amino-6-cyclopropyl pyrimidine are dissolved in 30 ml. of dry pyridine and 1.8 g. of N-benzyloxycarbonylsulphanilyl chloride (cf. H. Gregory, J. Chem. Soc. 1949, 2066) are added in portions. The reaction mixture is stirred, first for 14 hours at room temperature and then for 2 hours at 60° and then evaporated to dryness in vacuo. The residue is stirred with water and the mixture obtained is made strongly acid by the addition of concentrated hydrochloric acid. The precipitate is filtered off and dissolved in acetic acid and the $N^4$-benzyloxycarbonyl-$N^1$-(6-cyclopropyl-2-pyrimidynyl)-sulphanilamide is crystallised by the addition of water. It is filtered off and dried for 16 hours under high vacuum at 90–100°.

(d) A mixture of 50 ml. of pyridine, 10 ml. of acetanhydride and 10 g. of $N^4$-benzyloxycarbonyl-$N^1$-(6-cyclopropyl-2-pyrimidinyl)-sulphanilamide is stirred for 40 hours at 40°, a further 5 ml. of acetanhydride being added after the 20th hour. After cooling, the reaction mixture is diluted with 50 ml. of ether, shaken with a small amount of active charcoal, filtered and 500 ml. of hexane are slowly added to the filtrate. The precipitated crude product is filtered off under suction and recrystallised from tetrahydrofuran and ether. $N^4$-benzyl oxycarbonyl - $N^1$ - acetyl - $N^1$ - (6 - cyclopropyl - 2-pyrimidinyl)-sulphanilamide is obtained.

(e) 5 g. of crude product according to (d) are dissolved in 500 ml. of dry dioxane and the solution is hydrogenated in the presence of 10 g. of palladium-aluminum oxide catalyst (0.7% Pd). After 3 hours, no more starting material can be traced by thin layer chromatography.

The mixture is filtered and the filtrate is lyophilised. Practically pure, pulverulent $N^1$-acetyl-$N^1$-(6-cyclopropyl-2-pyrimidinyl)-sulphanilamide remains as residue.

The following compound, for example, can be produced in an analogous way if, in step (c), the correspondingly substituted aminopyrimidine is used: $N^1$-acetyl - $N^1$ - (5 - cyclopropyl - 2 - pyrimidinyl) - sulphanilamide (using 2-amino-5-cyclopropyl pyrimidine).

I claim:
1. A compound of the formula

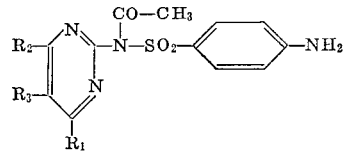

wherein
a single one of $R_1$, $R_2$ and $R_3$ represents cyclopropyl and, when not representing cyclopropyl,
$R_1$ and $R_2$ independently of each other represent hydrogen, halogen, lower alkyl, lower alkoxy or lower alkylthio, and
$R_3$ represents hydrogen, lower alkyl or lower alkoxy.
2. A compound as defined in claim 1, wherein each of $R_1$ and $R_2$ are hydrogen and $R_3$ is cyclopropyl.
3. A compound as defined in claim 1, wherein each of $R_1$ and $R_3$ are hydrogen and $R_2$ is cyclopropyl.

References Cited

UNITED STATES PATENTS 2,407,966  9/1946  Sprague _____ 260—239.75
2,891,949  6/1959  Webb et al. _____ 260—239.75

HENRY R. JILES, *Primary Examiner.*

HARRY J. MOATZ, *Assistant Examiner.*

U.S. Cl. X.R.

260—251, 256.4, 256.5, 257, 397.7, 470, 483, 593, 594; 167—65